United States Patent
Hartman et al.

(10) Patent No.: US 10,947,114 B2
(45) Date of Patent: Mar. 16, 2021

(54) METHODS AND APPARATUSES FOR PRODUCING CLATHRATE HYDRATES

(75) Inventors: Ryan Lee Hartman, Northpoint, AL (US); Brian S. Flowers, Tuscaloosa, AL (US)

(73) Assignee: NEW YORK UNIVERSITY, New York, NY (US)

( * ) Notice: Subject to any disclaimer, the term of this patent is extended or adjusted under 35 U.S.C. 154(b) by 675 days.

(21) Appl. No.: 14/241,259

(22) PCT Filed: Aug. 20, 2012

(86) PCT No.: PCT/US2012/051542
§ 371 (c)(1),
(2), (4) Date: Apr. 24, 2014

(87) PCT Pub. No.: WO2013/032756
PCT Pub. Date: Mar. 7, 2013

(65) Prior Publication Data
US 2015/0008367 A1    Jan. 8, 2015

Related U.S. Application Data (60) Provisional application No. 61/527,687, filed on Aug. 26, 2011.

(51) Int. Cl.
*C01B 3/00* (2006.01)
*F17C 11/00* (2006.01)

(52) U.S. Cl.
CPC .......... *C01B 3/0015* (2013.01); *C01B 3/001* (2013.01); *C01B 3/0084* (2013.01); *F17C 11/005* (2013.01); *C01B 3/0005* (2013.01); *Y02E 60/32* (2013.01)

(58) Field of Classification Search
CPC ................................ C01B 3/00; C09K 5/00
USPC ..................................................... 252/70, 71
See application file for complete search history.

(56) References Cited

U.S. PATENT DOCUMENTS

| | | | |
|---|---|---|---|
| 2003/0089117 A1 | 5/2003 | Mao et al. | |
| 2005/0059846 A1* | 3/2005 | Kohda | C10L 3/10 585/15 |
| 2006/0020151 A1* | 1/2006 | Palermo | G01N 25/48 585/15 |
| 2010/0055031 A1 | 3/2010 | Ahn | |
| 2011/0126914 A1* | 6/2011 | Hartman | B01J 19/0093 137/13 |

FOREIGN PATENT DOCUMENTS

WO    WO-2008/142560 A2    11/2008

OTHER PUBLICATIONS

Pennemann et al., Benchmarking of Microreactor Applications, Org Proc Res & Dev, 8:422-439, 2004.

Petersson et al., Free Flow Accoustophoresis: Microfuuidic-Based Mode of Particle and Cell Separation, Analytical Chemistry, 79:5117-5123, 2007.

(Continued)

*Primary Examiner* — Jane L Stanley
(74) *Attorney, Agent, or Firm* — Foley & Lardner LLP (57) ABSTRACT

Clathrate hydrates and methods of their production and separation are described herein. Methods of using the clathrate hydrates for energy storage are also described herein. Further described herein are hydrogen storage devices.

19 Claims, 6 Drawing Sheets

(56) References Cited

OTHER PUBLICATIONS

Petersson et al., Continuous separation of lipid particles from erythrocytes by means of laminar flow ans acoustic standing wave forces, Lab on a Chip, 5:20-22, 2005.
Poe et al., Solving the Clogging Problem: Precipitate-Forming Reactions in Flow, Angew. Chem. Int. Ed., 45:1544-1548, 2006.
Prasad et al., Hydrogen Storage in Double Clathrates with tert-Butylamine, J Phys Chem A, 113:6540-6543, 2009.
Roberge et al., Microreactor Technology: A Revolution for the Fine Chemical and Pharmaceutical Industries?, Chem Eng Tech, 28:318-323, 2005.
Sahoo et al., Multistep Continuous-Flow Microchemical Synthesis Involving Multiple Reactions and Separations, Angewandte Chemie-International Edition, 46:5704-5708, 2007.
Satyapal, S., U.S. Department of Energy's FY 2009 Hydrogen Program Annual Progress Report, DOE, Editor, 2009.
Schwalbe et al., Novel Innovation Systems for a Cellular Approach to Continuous Process Chemistry from Discovery to Market, Org Proc Res & Dev, 8:440-454, 2004.
Shin et al., Tetra-n-butylammonium Borohydride Semiclathrate: A Hybrid Material for Hydrogen Storage, J Phys Chem A, 113:6415-6418, 2009.
Song et al., Reactions in Droplets in Microfluidic Channels, Angew Chem Int Ed, 45:7336-7356, 2006.
Strobel et al., Hydrogen storage properties of clathrate hydrate materials, Fluid Phase Equilibria, 261:382-389, 2007.
Strobel et al., Thermodynamic predicitons of various tetrahydrofuran and hydrogen clathrate hydrates, Fluid Phase Equilibria, 280:61-67, 2009.
Strobel et al., Molecular Hydrogen Storage in Binary THF-H2 Clathrate Hydrates, J Phys Chem B, 110:17121-17125, 2006.
Stone et al., Engineering Flows in Small Devices: Microfluidics Toward a Lab-on-a-Chip, Ann Rev Fluid Mech, 36:381-411, 2004.
Su et al., Reversibel Hydrogen Storage in Hydrogel Clathrate Hydrates, Advanced Materials, 21:2382, 2009.
Subramanian et al., Structural transitions in methane+ethane gas hydrates—Part I: upper transition point and applicaitons, Chem Eng Sci, 55:5763, 2000.
Sugahara et al., Increasing Hydrogen Storage Capacity Using Tetrahydrofuran, J Am Chem Soc, 131:14616, 2009.
Taylor, G., Dispersion of soluble matter in solvent flowing slowly through a tube, 15 Proc R Soc London, Ser. A, 219:186-203, 1953.
Tsuda et al., Storage capacity of hydrogen in tetrahydrothiophene and furan clathrate hydrates, Chem Eng Sci, 64:4150-4154, 2009.
Tulk et al., Raman Spectroscopic Studies of THF Clathrate Hydrate, Journal of Physical Chemistry A, 102:8734-8739, 1998.
Turner, Monte Carlo Simulation of Equilibrium Reactions at Vapor—Liquid Interfaces, Journal of Physical Chemistry B, 109:23588-23595, 2005.
Turner, Monte Carlo Simulation of Equilibrium Reactions at Modified Vapor—Liquid Interfaces, Langmuir, 23:2525-2530, 2007.
Van Steijn et al., Velocity fluctuations of segmented flow in microchannels, Chem Eng J, 135:S159-S165, 2008.
Watts et al., Recent advances in synthetic micro reaction technology, Chem Comm, 443-467, 2007.
Willis et al., Monolithic Teflon membrane valves and pumps for harsh chemical and low-temperature use, Lab on a Chip, 7:1469-1474, 2007.
Xia et al., Soft Lithography, Annu Rev Mater Sci, 28:153-184, 1998.
Yen et al., A Microfabricated Gas-Liquid Segmented Flow Reactor for High-Temperature Synthesis: The Case of CdSe Quantum Dots, Angew Chem Int Ed, 44:5447-5451, 2005.
Yoon et al., Novel inorganic polymer derived microreactors for organic microchemistry applications, Lab on a Chip, 8:1454-1459, 2008.
Alavi et al., Molecular-dynamics simulations of binary structure II hydrogen and tetrahydrofurane clathrates, J Chem Phys, 124:014704, 2006.
Alavi et al., Hydrogen-Gas Migration through Clathrate Hydrate Cages, Angew Chem Int Ed, 46:6102, 2007.
Alavi et al., Effect of Guest-Host Hydrogen Bonding on the Structures and Properties of Clathrate Hydrates, Chem Eur J, 16:1017-1025, 2010.
Carter et al., Gas Storgare in "Dry Water" and "Dry Gel" Clathrates, Langmuir, 26:3186-3193, 2010.
Chen et al., Using Microfluidics to Observe the Effect of Mixing on Nucleation of Protein Crystals, J. Am. Chem. Soc., 127:9672-9673, 2005.
Chow, Lab-on-a-Chip: Opportunities for Chemical Engineering, A.W., AIChE J, 48, 1590-1595, 2002.
Conrad et al., Tetrahydrofuran Clathrate Hydrate Formation, Phys Rev Lett, 103:218301, 2009.
Fletcher et al., Micro reactors: principles and applications in organic synthesis, Tetrahedron, 58:4735-4757, 2002.
Geng et al., Molecular dynamics simulation on the decomposition of type SII hydrogen hydrate and the performance of tetrahydrofuran as a stabiliser, Molecular Simulation, 36:474-483, 2010.
Geyer et al., Microreactors as Tools for Synthetic Chemists—The Chemists' Round-Bottomed Flask of the 21st Century?, Chem Eur J, 12:8434-8442, 2006.
Grover et al., Teflon films for chemically-inert microfluidic valves and pumps, Lab on a Chip, 8:913-918, 2008.
Gunther et al., Micromixing of Miscible Liquids in Segmented Gas-Liquid Flow, Langmuir, 2:1547-1555, 2005.
Hartman et al., Multistep Microchemical Synthesis Enabled by Microfluidic Distillation, Angew Chem Int Ed, 49:899-903, 2010.
Hartman et al., Distillation in microchemical systems using capillary forces and segmented flow, Lab on a Chip, 9:1843-1849, 2009.
Hartman et al., Microchemical systems for continuous-flow synthesis, Lab on a Chip, 9:2495-2507, 2009.
Hartman et al., Overcoming the Challenges of Solid Bridging and Constriction during Pd-Catalyzed C—N Bond Formation in Microreactors, Org Proc Res & Dev, 14:1347-1357, 2010.
Hashimoto et al., Thermodynamic and Raman spectroscopic studies on H2 + tetrahydrofuran + water and H2 + tetra-n-butyl ammonium bromide + water mixtures containing gas hydrates, Chemical Engineering Science, 61:7884-7888, 2006.
Haswell et al., Teh application of micro reactors to synthetic chemistry, Chem Commun, 391-398, 2001.
Haswell et al., Green chemistry: synthesis in micro reactors, Green Chem, 5:240-249, 2003.
Hessel et al., Organic Synthesis with Microstructured Reactors, Chem Eng Tech, 28:267-284, 2005.
Heyduk et al., Hydrogen Produced from Hydrohalic Acid Solutions by a Two-Electron Mixed-Valence Photocatalyst, Science, 293:1639-1641, 2001.
Hornbach et al., Critically pressured free-gas reservoirs below gas-hydrate provinces, Nature, 427:142, 2004.
Ismagilov et al., Experimental and theoretical scaling laws for transverse diffusive broadening in two-phase laminar flows in microchannels, Appl Phys Lett, 76:2376-2378, 2000.
Jahnisch et al., Chemistry in Microstructured Reactors, Angew Chem Int Ed, 43:406-446, 2004.
Jensen, Microreaction engineering—is small better?, Chem Eng Sci, 56:293-303, 2001.
Jensen, Silicon-Based Microchemical Systems: Characteristics and Applications, MRS Bulletin, 31:101-107, 2006.
Kang et al., Formation Characteristics of Synthesized Natural Gas Hydrates in Meso- and Macroporous Silica Gels, J Phys Chem B, 114:6973-6978, 2010.
Khan et al., Microfluidic Synthesis of Titania Shells on Colloidal Silica, Adv Mater, 19,:2556-2560, 2007.
Khan et al., Microfluidic Synthesis of Colloidal Silica, Langmuir, 20:8604-8611, 2004.
Knitter et al., Ceramic microreactors for heterogeneously catalysed gas-phase reactions, Lab on a Chip, 4:378-383, 2004.
Knitter et al., Microfabrication of ceramic microreactors, Microsystems Techn, 7:85-90, 2001.
Kockmann et al., Enabling Continuous-Flow Chemistry in Microstructured Devices for Pharmaceutical and Fine-Chemical Production, Chem Eur J, 14:7470-7477, 2008.

(56) References Cited

OTHER PUBLICATIONS

Kreutzer et al., Sample Dispersion for Segmented Flow in Microchannels with Rectangular Cross Section, Anal Chem, 80:1558-1567, 2008.
Kikutani et al., Pile-up glass microreactor, Lab on a Chip, 2:193-196, 2002.
Kikutani et al., Glass microchip with three-dimensional microchannel network for 2X2 parallel synthesis, Lab on a Chip, 3:51, 2003.
Laurell et al., Chip integrated strategies for acoustic separation and manipulation of cells and particles, Chemical Society Reviews, 36:492-506, 2007.
Lee et al., Solvent Compatibility of Poly(dimethylsiloxane)-Based Microfludic Devices, Anal Chem, 75:6544-6554, 2003.
Lee et al., Tuning clathrate hydrates for hydrogen storage, Nature, 434:743-746, 2005.
Losey et al., Microfabricated Multiphase Packed-Bed Reactors: Characterization of Mass Transfer and Reactions, Ind & Eng Chem Res, 40:2555-2562, 2001.
Mao et al., Hydrogen Clusters in Clathrate Hydrate, Science, 297:2247-2249, 2002.
Marre et al., Supercritical Continuous-Microflow Synthesis of Narrow Size Distribution Quantum Dots, Adv Mater, 20:4834, 2008.
Marre et al., Synthesis of micro and nanostructures in microfluidic systems, Chem Soc Rev, 39:1183-1202, 2010.
Mulder et al., Hydrogen in Porous Tetrahydrofuran Clathrate Hydrate, Chem Phys, 9:1331-1337, 2008.
Muradoglu et al., Mixing in a drop moving through a serpentine channel: A computational study, Phys Fluids, 17:073305, 2005.
Nagai et al., Binary Hydrogen-Tetrahydrofuran Clathrate Hydrate Formation Kinetics and Models, AIChE Journal, 54:3007-3016, 2008.
Nakayama et al., Engineering Investigation of Hydrogen Storage in the Form of Clathrate Hydrates: Conceptual Design of Hydrate Production Plants, Energy & Fuels, 24:2576-2588, 2010.
Nilsson et al., Acoustic control of suspended particles in micro fluidic chips, Lab on a Chip, 4:131-135, 2004.
Ogata et al., Storage capacity of hydrogen in tetrahydrofuran hydrate, Chem Eng Sci, 63:5714-5718, 2008.
Ogata et al., Hydrogen storage in trimethylamine hydrate: Thermodynamic stability and hydrogen storage capacity of hydrogen+trimethylamine mixed semi-clathrate hydrate, Chem Eng Sci, 65:1616-1620, 2010.
Egorov, "Systematika, printsipy raboty i oblasty primeneniya datchikov (Systematics, the principle of operation and sensor applications)", Zhurnal radioelectoniki (Journal of Radio Electronics), 2009, vol. 3, 22 pages (English abstract).
International Search Report and Written Opinion in PCT/US2012/051542, dated Nov. 22, 2012, 6 pages.

* cited by examiner

METHODS AND APPARATUSES FOR PRODUCING CLATHRATE HYDRATES

FIELD

The subject matter disclosed herein generally relates to clathrate hydrates and methods of their production. Also, the subject matter described herein generally relates to methods of using clathrate hydrates for hydrogen storage. The subject matter described herein further relates to the development of hydrogen storage devices.

BACKGROUND

Clathrate hydrates are inclusion compounds that trap small molecules (<10 Angstroms) within hydrogen bonded water cages (i.e., a form of ice). The discovery that hydrates can be used to capture and store hydrogen has motivated numerous investigations on the thermodynamics and kinetics of formation. Clathrate hydrates have also gained scientific interest in recent years because of their impact on a number of societal issues, such as current energy production (see Subramanian et al., Chem Eng Sci, 2000, 55, 5763), the potential for energy storage (see Ogata et al., Chem Eng Sci, 2008, 63, 5714; Alavi et al., Angew Chem Int Ed, 2007, 46, 6102; Strobel et al., Fluid Phase Equilibr., 2007, 261, 382; Lee et al., Nature, 2005, 434, 743), climate change (see Hornbach et al., Nature, 2004, 427, 142), and future sources of energy (see Koh et al., Nature, 2004, 427, 142).

There is a basic understanding of the most commonly formed equilibrium crystal structures (e.g., sI, sII, and sH), while ongoing work has revealed new crystals and elucidated that additional guest molecules, like tetrahydrofuran and tert-butylamine, show promise to make hydrates competitive with compressed gas and sorption storage techniques (see Sugahara et al., J Am Chem Soc, 2009, 131, 14616). Nevertheless, there remain significant challenges in meeting energy storage goals with current and new hybrid materials. The safe and efficient storage of chemical energy will become increasingly important as science advances the discovery of catalysts that harness solar energy to generate hydrogen. Furthermore, understanding how to release chemical energy from such materials is crucial, and the impact of hydrate structures on energy related issues warrants, in addition to thermodynamics, an intrinsic understanding of the time dependent principles that govern hydrate transformations.

SUMMARY

In accordance with the purposes of the disclosed materials and methods, as embodied and broadly described herein, the disclosed subject matter, in one aspect, relates to methods for producing clathrate hydrates and using them to store hydrogen. In a further aspect, the disclosed subject matter relates to methods of continuously producing $THF+H_2$ hydrate. In a further aspect, the disclosed methods relate to methods of isolating clathrate hydrates. The disclosed subject matter also relates to methods and devices for storing hydrogen.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying figures, which are incorporated in and constitute a part of this specification, illustrate several aspects described below.

DETAILED DESCRIPTION

The materials, compounds, compositions, and methods described herein may be understood more readily by reference to the following detailed description of specific aspects of the disclosed subject matter, the Figures, and the Examples included therein.

Before the present materials, compounds, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

Definitions

In this specification and in the claims that follow, reference will be made to a number of terms, which shall be defined to have the following meanings:

Throughout the specification and claims the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a hydrate" includes mixtures of two or more such hydrates, reference to "an aqueous solution" includes mixtures of two or more such aqueous solutions, reference to "the clathrate hydrate" includes mixtures of two or more such clathrate hydrates, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

References in the specification and concluding claims to parts by weight of a particular element or component in a composition denotes the weight relationship between the element or component and any other elements or components in the composition or article for which a part by weight is expressed. Thus, in a mixture containing 2 parts by weight of component X and 5 parts by weight component Y, X and Y are present at a weight ratio of 2:5, and are present in such ratio regardless of whether additional components are contained in the mixture.

A weight percent (wt. %) of a component, unless specifically stated to the contrary, is based on the total weight of the formulation or composition in which the component is included.

Reference will now be made in detail to specific aspects of the disclosed materials, compounds, compositions, articles, and methods, examples of which are illustrated in the accompanying Examples and Figures.

Clathrate Hydrates

Clathrate hydrates are a particular kind of gas hydrate where gases including, for example, carbon dioxide, methane, and hydrogen gas, are enclosed within a lattice of water molecules. The use of clathrate hydrates to store energy has received considerable attention in recent years. A fully loaded methane hydrate contains about 170 volumes of methane (STP) per volume of hydrate, which is comparable to the density of highly compressed gas (see Strobel et al., Fluid Phase Equilibria, 2007, 261, 382-389). Thus, hydrogen hydrates are suitable as a material platform for chemical energy storage (see Sugahara et al., J Am Chem Soc, 2009, 131, 14616).

Gas hydrates form different crystal structures and the most common are denoted as Structure I (sI), Structure II (sII), and Structure H (sH). The number and arrangement of hydrogen bonded water molecules determine a variety of cavities, that when combined, make up the different structure types. Multiple or single guest occupancy can occur depending on the hydrate type, the cavity size, and the guest molecule size. Either four or two $H_2$ molecules can occupy the $5^{12}6^4$ and $5^{12}$ cages of sII hydrate, which exhibit cage diameters of 6.67 and 5.02 Angstroms, respectively (see Mao et al., Science, 2002, 297, 2247-2249).

The formation of clathrate hydrates can occur at low to moderate temperatures (0-30° C.) and high pressures, ranging from 5 to 2000 bar. Pressures of 1800-2200 bar form pure hydrogen hydrates near ambient temperatures (see Lee et al., Nature, 2005, 434, 743-746). While these conditions are not competitive with the pressure requirements to compress hydrogen gas (350-700 bar), the inclusion of THF can reduce the requirement to about 50-120 bar (see Ogata et al., Chem Eng Sci, 2008, 63, 5714-5718; Strobel et al., Fluid Phase Equilibria, 2007, 261, 382-389; Sugahara et al., J Am Chem Soc, 2009, 131, 14616; Alavi et al., J Chem Phys, 2006, 124, 014704; Alavi et al., Chem Eur J, 2010, 16, 1017-1025; Conrad et al., Phys Rev Lett, 2009, 103, 218301; Nagai et al., AIChE J, 2008, 54, 3007-3016; Ogata et al., Chem Eng Sci, 2010, 65, 1616-1620; Prasad et al., J Phys Chem A, 2009, 113, 6540-6543; Shin et al., J Phys Chem A, 2009, 113, 6415-6418; Strobel et al., J Phys Chem B, 2006, 110, 17121-17125; Tsuda et al., Chem Eng Sci, 2009, 64, 4150-4154; Mulder et al., Chem Phys, 2008, 9, 1331-1337). Polar guest molecules, such as THF, enhance the stability of hydrate structures by strengthening the hydrogen bonding in these non-covalently bonded materials.

Considerable efforts have been made towards understanding the conditions and the amount of hydrogen that can be stored in the form of hydrates, both experimentally and computationally. Structure II (sII) hydrogen hydrate has a unit cell comprising $5^{12}6^4$ and $5^{12}$ cages. Four $H_2$ molecules can occupy the $5^{12}6^4$ cages and two $H_2$ molecules can occupy the $5^{12}$ cages. Introducing THF reduces the hydrogen gas content for the sII hydrate as THF occupies the $5^{12}6^4$ cages (see Mao et al., Science, 2002, 297, 2247-2249; Lee et al., Nature, 2005, 434, 743-746). Introducing THF at 120 bar (12 MPa) leads to the formation of binary $THF+H_2$ hydrates (sII) (see Lee et al., Nature, 2005, 434, 743-746). The cost, however, of reducing the pressure requirements from about 2000 bar to about 120 bar is a compromise in the hydrogen storage capacity, as shown by plotting the mass of hydrogen stored (wt%) as a function of the THF concentration (mol%). Increasing the number of $5^{12}6^4$ cages occupied by THF from Region I to III can lead to an overall reduction in occupancy of hydrogen. Although this result can limit the utility of hydrates for onboard applications, it is useful for stationary storage, where severe volume restrictions do not exist, yet safety concerns are considerable.

Methods of Forming Hydrogen Hydrates

The formation of $THF+H_2$ hydrates is a multistep chemical process (see Nagai et al., AIChE Journal, 2008, 54, 3007-3016; Nakayama et al., Energy & Fuels, 2010, 24, 2576-2588). Tetrahydrofuran hydrate crystals are initially formed and free of any hydrogen. Prolonged exposure of THF hydrate to hydrogen gas (e.g., at 120 bar) leads to the molecular diffusion of hydrogen into the crystalline structure. Consequently, the hydrogen hydrate formation rate is controlled by the diffusion of hydrogen through the interconnecting cage faces that make up the sII hydrate and the specific surface area of the THF hydrate particles. The conceptual batch manufacturing of $THF+H_2$ hydrates involves 1) the formation of THF hydrates in an ice-maker, 2) a $THF+H_2$ hydrate forming reactor, 3) the subsequent removal of excess gas or waste water, and 4) the storage of $THF+H_2$ hydrate in a silo (see Nakayama et al., Energy & Fuels, 2010, 24, 2576-2588). The amount of energy stored relative to the energy input in this production scheme is estimated to be 1.8-5.0 (see Nakayama et al., Energy & Fuels, 2010, 24, 2576-2588). Although such a process can be capable of producing massive quantities of hydrates, it is inherently unsafe and inefficient. Each unit operation presents the hazard of massive quantities of highly pressurized hydrogen gas, which is unacceptable for residential scenarios and even most industrial standards. Furthermore, performing mass transport limited reactions in batch reactors leads to unnecessary production times and inefficiencies in heat management (see Hartman et al., Lab on a Chip, 2009, 9, 2495-2507; Hartman et al., Lab on a Chip, 2009, 9, 1843-1849; Hartman et al., Angew Chem Int Ed, 2010, 49, 899-903; Hartman et al., Org Proc Res & Dev, 2010, 14, 1347-1357).

Disclosed herein are methods of producing clathrate hydrates that comprise providing a multiphase segmented microfluidic flow, wherein one phase of the multiphase segmented microfluidic flow is an aqueous phase and another phase is a hydrogen gas phase, adding a secondary guest molecule to the flow; and forming the clathrate hydrate under hydrate forming conditions. These disclosed methods use a gas-liquid multiphase segmented flow to form the clathrate hydrate. Alternative methods can also be used in which the clathrate hydrate are formed with a liquid-liquid multiphase segmented microfluidic flow. In another embodiment, disclosed herein are methods of producing clathrate hydrate that comprise providing a multiphase segmented microfluidic flow, wherein one phase of the multiphase segmented microfluidic flow is an aqueous phase and another phase is an inert oil phase, adding hydrogen gas and a secondary guest molecule to the flow, and forming the clathrate hydrate under hydrate forming conditions. These flows are created in a channel of a microreactor. The scale up of the clathrate hydrate formation can be accomplished by increasing the size of the channels (volume of the flow) and/or by increasing the number of the channels (e.g., using an array of connected microreactors).

The disclosed processes can be continuous processes, which virtually eliminates transport resistances, provides significant safety benefits, and yields minimal thermodynamic losses. The synthesis of hydrogen hydrate in continuous flow, microreactors offers a novel SNM process to overcome transport limitations while providing a safe and efficient platform for the storage of hydrogen in residential communities.

Secondary Guest Molecules

The thermodynamic efficiency of the methods described herein can be enhanced with minor amounts of a secondary guest molecule, such as, for example, tetrahydrofuran (THF), tert-butylamine (t-BA), hexafluorophosphoric acid ($HPF_6$), and tetrabutylammonium bromide (TBAB). As used herein, any guest molecule can be substituted in the methods described herein. Thus, when THF is recited or exemplified as the guest molecule, it is understood that t-BA, $HPF_6$, or TBAB can be used in its place. Any corresponding compromises in energy density are acceptable in most stationary applications.

Amounts of secondary guest molecules that can be used herein are from about 0.15 to about 5 mol %, for example from about 0.5 to about 1 mol %, from about 1 to about 2.5 mol %, from about 2.5 to about 5 mol %, from about 1 to about 5 mol %, from about 0.25 to about 1 mol %, and the like.

Figure 2:
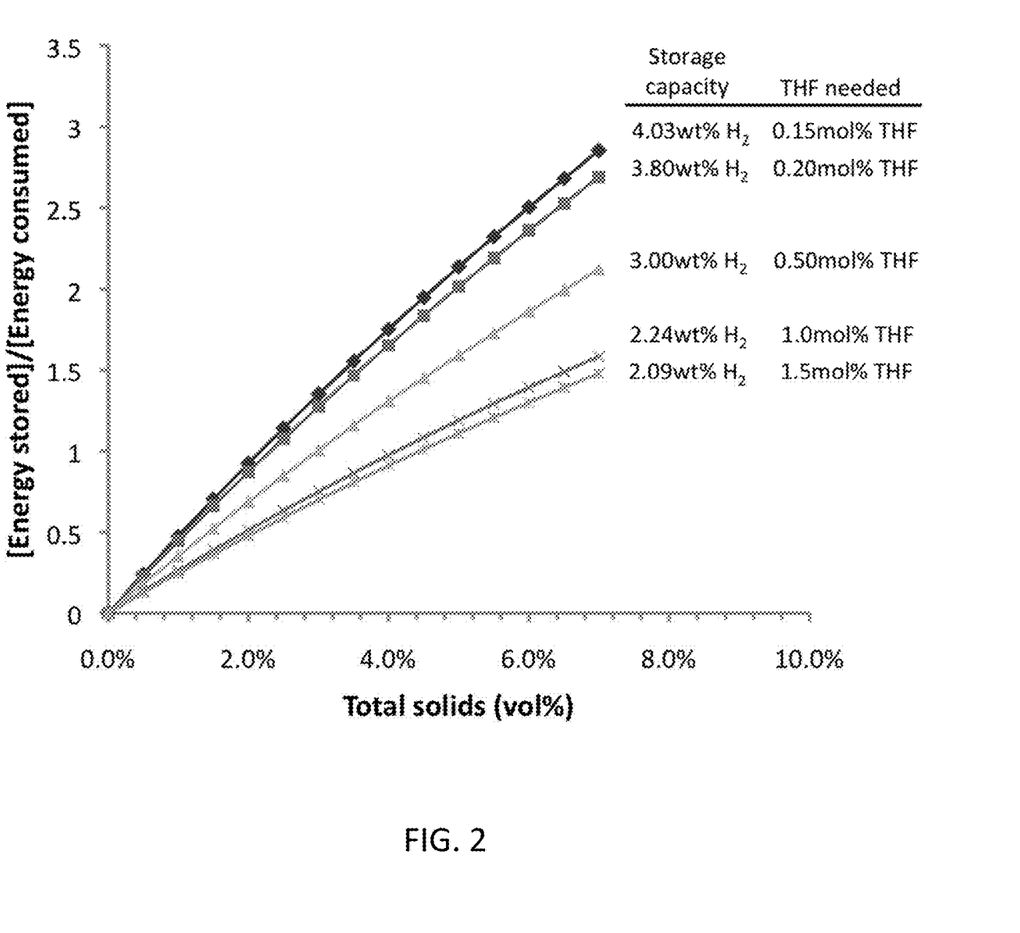
FIG. 2 is a graph demonstrating the thermodynamic efficiency relative to the hydrate solids content for various storage capacities.

The amount of energy stored in $THF+H_2$ hydrate relative to the energy consumed can be estimated (Mao et al., Science, 2002, 297, 2247-2249; Lee et al., Nature, 2005, 434, 743-746) and the results are shown in FIG. 2 as a function of the total solids content (vol %). In view of the work required to compress $H_2$ gas, cool water, and form ice, the theoretical amount of $H_2$ stored relative to the energy consumed is approximately 12.7. The suspension of clathrate hydrate in solution, however, requires energy to cool the excess make-up water. Therefore, both the concentration of THF in the make-up water and the relative amount of hydrate solids formed (vol %) are considered in the design of a continuous flow hydrate manufacturing process. As shown in FIG. 2, the most efficient process (e.g., storage capacity of 4.03 wt % $H_2$) would use approximately 0.15 mol % THF in the make-up water. In 2008, the average residential utility customer in the United States used 30 kW*h per day, which corresponds to 21.5 kg THF/day (i.e., 6.4 gal/day). The production of THF worldwide is currently at $2.0 \times 10^8$ kg/yr. A recycle establishes a self-contained device in which THF is neither added nor removed and the energy consumption to cool the make-up water conserved. The methods described herein provide safe and efficient hydrate manufacturing devices.

After formation, the clathrate hydrates can be isolated and then used or stored. One way of storing the clathrate hydrates produced in the disclosed methods is shut them in inside the microreactor used in their synthesis (i.e., stopping and sealing the micrreactor).

Microreactors

In the disclosed methods the segmented multiphase microfluidic flows are formed in channels of a microreactor. The safety concerns and transport limitations in batch production are eliminated in the disclosed methods by the use of microreactor systems, where the volumes are limited to microliters. Telescoping the reaction steps is accomplished by forming hydrates in gas-liquid or liquid-liquid continuous flow microreactors. This not only increases the interfacial contact between the phases (i.e., improves the efficiency of a mass transport limited reaction), but also reduces the holdup of hydrogen gas in the system (i.e., improves safety). The continuous flow manufacturing of hydrates reduces equipment volumes, limits the quantities of hazardous materials, and improves the overall efficiency of $THF+H_2$ hydrate formation. Consequently, the energy input required to form hydrates relative to the energy stored is reduced.

Over the last decade, microreactor systems have evolved from simple devices for basic chemical transformations to instrumental tools capable of advancing materials science (see Hartman et al., Lab on a Chip, 2009, 9, 2495-2507; Ehrfeld, W., *Microreaction Technology*, 1997, Berlin: Springer; Ehrfeld et al., *Microreactors: New Technology for Modern Chemistry*, 2000, Weinheim, Germany: Wiley-VCH; Fletcher et al., Tetrahedron, 2002, 58, 4735-4757; Geyer et al., Chem Eur J, 2006, 12, 8434-8442; Haswell et al., Chem Commun, 2001, 391-398; Haswell et al., Green Chem, 2003, 5, 240-249; Hessel et al., Chem Eng Tech, 2005, 28, 267-284; Jahnisch et al., Angew Chem Int Ed, 2004, 43, 406-446; Jensen, K. F., MRS Bulletin, 2006, 31, 101-107; Kockmann et al., Chem Eur J, 2008, 14, 7470-7477; Pennemann et al., Org Proc Res & Dev, 2004, 8, 422-439; Roberge et al., Chem Eng Tech, 2005, 28, 318-323; Seeberger, P. H. and T. Blume, eds. *New Avenues to Efficient Chemical Synthesis: Emerging Technologies*, 2007, Springer: New York, 240; Watts et al., Chem Comm, 2007, 443-467). Early studies revealed that performing reactions in microstructured reactors can dramatically influence the outcome of a reaction because the conversion and selectivity are dependent on the intrinsic rate of reaction relative to mixing and heat transfer rates. The flow of gas and liquid through a silicon microreactor takes a form of a gas-liquid segmented flow. The microreactor can be integrated with a compression chuck that controls the inlet and outlet temperatures of reacting fluids. Circulation within the dispersed droplets leads to well-mixed, micro-scale batch reactors, and this has been exploited to synthesize particles under high temperature (up to 350° C.) and pressure conditions (200 bar) (see Song et al., Angew Chem Int Ed, 2006, 45, 7336-7356; Gunther et al., Langmuir, 2005, 21, 1547-1555; Ismagilov et al., Appl Phys Lett, 2000, 76, 2376-2378; Kreutzer et al., Anal Chem, 2008, 80, 1558-1567; Muradoglu et al., Phys Fluids, 2005, 17, 073305; Stone et al., Ann Rev Fluid Mech, 2004, 36, 381-411; Taylor, G., Proc R Soc London, Ser. A, 1953, 219, 186-203; van Steijn et al., Chem Eng J, 2008, 135, S159-S165; Yen et al., Angew Chem Int Ed, 2005, 44, 5447-5451; Mane et al., Chem Soc Rev, 2010, 39, 1183-1202; Khan et al., Langmuir, 2004, 20, 8604-8611; Khan et al., Adv Mater, 2007, 19, 2556; Mane et al., Adv Mater, 2008, 20, 4834; Yen et al., Angew Chem Int Ed, 2005, 44, 5447-5451). The interfacial contact between the gas and liquid is two orders of magnitude larger than the headspace in a conventional batch reactor. Thus, the mass transport coefficients measured in multiphase gas-liquid-solid microreactions can be as much as two orders of magnitude larger than conventional reactor designs (see Losey et al., Ind & Eng Chem Res, 2001, 40, 2555-2562).

The choice of microreactor materials for use in the disclosed methods depends on the nature of the chemistry, operating conditions, and ease of fabrication. Microchemical systems usable in the disclosed methods can be fabricated from a wide range of materials, including polymers (see Grover et al., Lab on a Chip, 2008, 8, 913-918; Lee et al., Anal Chem, 2003, 75, 6544-6554; Willis et al., Lab on a Chip, 2007, 7, 1469-1474; Xia et al., Annu Rev Mater Sci, 1998, 28, 153-184; Yoon et al., Lab on a Chip, 2008, 8, 1454-1459), glass (see Fletcher et al., Tetrahedron, 2002, 58, 4735-4757; Chow, A. W., AIChE J, 2002, 48, 1590-1595; Kikutani et al., Lab on a Chip, 2002, 2, 193-196; Kikutani et al., Lab on a Chip, 2003, 3, 51), silicon (see Jensen, K. F., MRS Bulletin, 2006, 31, 101-107; Jensen, K. F., Chem Eng Sci, 2001, 56, 293-303), ceramics (see Knitter et al., Microsystems Techn, 2001, 7, 85-90; Knitter et al., Lab on a Chip, 2004, 4, 378-383), and steel (see Ehrfeld et al., *Microreactors: New Technology for Modern Chemistry*, 2000, Weinheim, Germany: Wiley-VCH; Jahnisch et al., Angew Chem Int Ed, 2004, 43, 406-446; Hessel, V., H. S., and H. Lowe, *Chemical Micro Process Engineering: Fundamentals, Modeling and Reactions*. 2004, Weinheim, Germany: Wiley-VCH; Schwalbe et al., Org Proc Res & Dev, 2004, 8, 440-454). An advantage of silicon and glass-based microsystems includes their ability to withstand high pressures. Given that pressures on the order of 100 bar are used to form hydrogen hydrates, glass-based microreactors are preferred for the methods disclosed herein.

Suitable microreactors for use herein can have channels with cross-sectional dimensions of from about 1 to about 10 μm, from about 10 to about 100 μm, from about 100 to about 1000 μm, or greater than about 1000 μm.

An advantage of using transparent microreactors is the ability to perform the in-situ analysis of chemical transformations. In some examples, glass microreactors can be combined with confocal Raman microscopy to allow in-situ analysis of hydrogen hydrate formation. The creation of stable fluidic interfaces between these devices and macroscopic fluid handling (e.g., pumps), so-called "packaging", can be performed by integrating commercially available fittings and tubing with specially designed high pressure compression parts.

It has been demonstrated that the multistep synthesis of important organic compounds is possible by integrating multiple microscale unit operations (see Hartman et al., Angew. Chem. Int. Ed., 2010, 49, 899-903; Sahoo et al., Angewandte Chemie-International Edition, 2007, 46, 5704-5708). Combining microreactors with microseparators can create a microscale chemical plant, capable of continuously manufacturing mg/hr quantities of fine chemicals. This concept has also been applied to safely and continuously manufacture extremely hazardous organic intermediates (e.g., organic azides and isocyanates). These results provide additional support for the microchemical device for the manufacturing of a clathrate hydrate (e.g., $THF+H_2$).

The formation and transport of solid particles can sometimes lead to clogging in microreactors via two characteristic mechanisms: I) the hydrodynamic bridging of micron-sized particles and/or 2) the deposition or growth from surfaces resulting in constriction. Both of these mechanisms can contribute to clathrate hydrate clogging in microreactors when the particles are allowed to reach tens of micrometers in size or when prolonged exposure to surfaces takes place. However, the methods described herein minimize these risks by constraining clatharate hydrate particle sizes to sub-micrometers (e.g., nanoparticles) and suspension of the particles in dispersed droplets (see Poe et al., Angew. Chem. Int. Ed., 2006, 45, 1544-1548; Song et al., Angew. Chem. Int. Ed., 2006, 45, 7336-7356). Immiscible carrier fluids that preferentially wet microchannel surfaces can be used to isolate crystals formed in microflow (see Chen et al., Journal of the American Chemical Society, 2005, 127, 9672-9673). This technique can also be applied herein to concentrate the volume of clathrate hydrate relative to the make-up water volume, and in turn maximize the thermodynamic efficiency of the hydrate forming process.

Conditions

The clathrate hydrate particles can be formed in the disclosed mulitphase segmented flows under hydrate forming conditions. These conditions are generally, low to moderate temperatures (−10° C. to 25° C.) and high pressures (10 bar to 200 bar). For example, temperatures of about −10, −9, −8, −7, −6, −5, −4, −3, −2, −1, 0, 1, 2, 3, 4, 5, 6, 7, 8, 9, 10, 11, 12, 3, 14, 15, 16, 17, 18, 19, 20, 21, 22, 23, 24, or 25° C. can be used, where any of the stated values can form an upper or lower endpoint of a range. Specific examples include from about −10 to about 0° C., from about 4 to about 10° C., from about 15 to about 25° C., from about 20 to about 25° C., from about −10 to about −5° C. and the like. Further, exemplary pressures, which can be used with any of the temperature ranges noted herein, can be about 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200 bar, where any of the stated values can form an upper or lower endpoint of a range. Specific examples include from about 10 to about 100 bar, from about 50 to about 150 bar, from about 100 to about 200 bar, from about 25 to about 75 bar, from about 125 to about 175 bar, and the like. In a preferred aspect, the clathrate hydrates are formed at about 3° C. and about 50 to about 120 bar.

The specific physical properties of numerous clathrate hydrates are readily available in the "Clathrate Hydrate Physical Property Database" operated and maintained by the National Institutes of Standards and Technology. This database, also called NIST Standard Reference Database #156, provides references teaching the particular conditions used to create a given clathrate hydrate in the database. Thus, for a particular clathrate hydrate, the conditions for forming the clathrate hydrate are readily available.

Uses

The accurate measurement of intrinsic kinetics is often impeded by the presence of heat and mass transport resistances in the high pressure static cells and agitated batch vessels commonly applied to study hydrates. Alternatively, the synthesis of gas hydrates in continuous flow, microreactors as described herein offers a novel approach to overcome transport limitations while demonstrating the fundamentals of hydrate formation, stability, and dissociation. The flow of gas and liquid through a microreactor takes a form of segmented flow (i.e., well mixed micro-scale batch reactors), which are used to synthesize and tailor particles. The mass transport coefficients within these multiphase gas-liquid-solid microreactors are as much as two orders of magnitude larger than conventional reactor designs. Disagreements between predictive models and experiments in the literature suggest that experimentally measured hydrate formation kinetics are likely mass transfer limited, whereby the formation rate is controlled by the magnitude of a mass transport coefficient proportional to the gas-liquid-solid interfacial contact. Transport limitations are also expected to influence hydrate dissociation.

Methods of safe and efficient energy storage through the continuous flow manufacturing of ice particles that capture hydrogen are described herein. Hydrogen gas has a high energy density (142 MJ/kg), which makes it an attractive compound for chemical energy storage. While routes for producing hydrogen from a variety of feedstocks have been explored, the safe and efficient storage of hydrogen remained as an elusive challenge. The high energy requirements to compress hydrogen gas and safety concerns prompted the need for innovative storage technologies. Clathrate hydrate research has generated a basic understanding of how hydrogen can be stored in these inclusion compounds, while ongoing work has revealed that guest molecules such as tetrahydrofuran (THF) make hydrates thermodynamically competitive with compressed gas and sorption storage technology (see Sugahara et al., J Am Chem Soc, 2009, 131, 14616). However, the fundamental materials innovation represented only the first step toward solving a significant challenge. Progress was still needed in the design of manufacturing devices that store hydrogen in nanomaterials (Carter et al., Langmuir, 2010, 26, 3186-3193; Su et al., Advanced Materials, 2009, 21, 2382; Kang et al., J Phys Chem B, 2010, 114, 6973-6978). Described herein are methods of addressing this problem by employing clathrate hydrate science and microreactor systems. Specifically, provided herein are safe and efficient microchemical systems for the scalable manufacturing of hydrogen hydrates.

Figure 1:
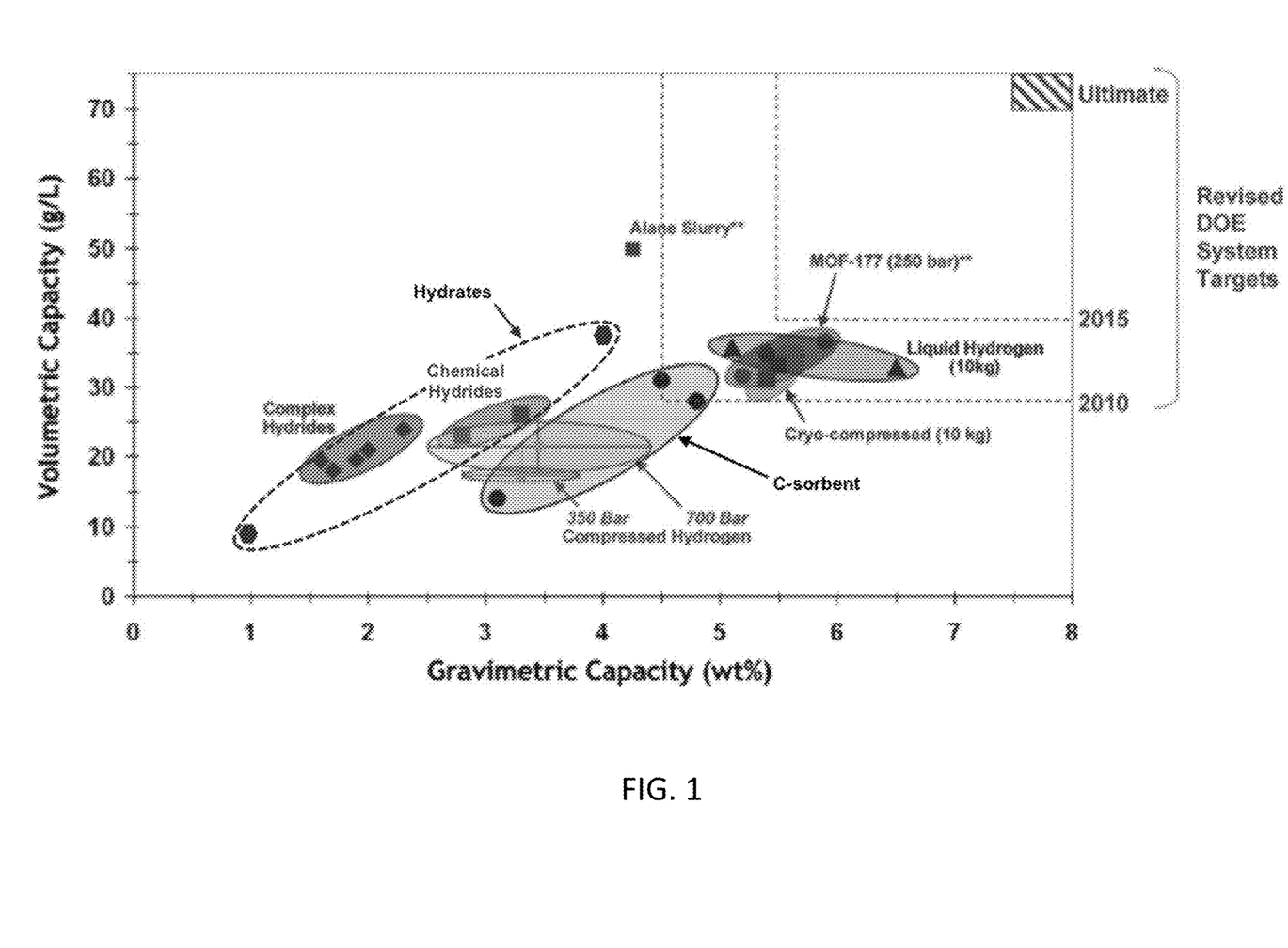
FIG. 1 is a graph showing the volumetric capacity against the gravimetric capacity for different hydrogen storage technologies. Storage targets for onboard fuel cell applications are also shown (see Satyapal, S., *U.S. Department of Energy's FY* 2009 *Hydrogen Program Annual Progress Report*, DOE, Editor, 2009).

A number of useful materials are available for portable hydrogen storage. As shown in FIG. 1, complex hydrides, chemical hydrides, gas hydrates, compressed hydrogen, and carbon-based sorption materials exhibit similar storage capacities, capable of storing less than 5 wt % hydrogen. To date, the majority of these technologies do not meet the onboard storage goals set by the Department of Energy (e.g., 4.5 wt % by 2010 and 5.5 wt % by 2015). However, the constraints are different for stationary hydrogen storage. The volume and mass constraints are not nearly as critical for storing hydrogen at commercial facilities or residential communities, and thus, the materials and techniques in FIG. 1 can find utility in stationary applications.

When considering stationary applications, the hydrogen storage technologies outlined in FIG. 1 have particular advantages and disadvantages. Issues with complex metal hydrides include slow uptake and release kinetics, cost, and safety concerns in the presence of moisture (e.g., metal hydrides react violently with water). Key issues still remain, such as energy lost during regeneration, cost, life-cycle impacts, and the need for noble-metal-supported catalyst. Sorption materials, such as single-walled carbon nanotubes, are attractive for hydrogen storage (3 to 5 wt %). However, low-cost, high-volume manufacturing processes must be developed in order for them to be economically viable. Compressed, cryo-compressed, and liquid hydrogen technologies have competitive storage capacities (ranging from 2.5 to 6.5 wt %), but the compression is energy-intensive and there are significant safety concerns at commercial and residential scales. Intense energy requirements are also needed to store hydrogen in the form of hydrates, but hydrate formation pressures (about 2000 bar) can be significantly reduced in the presence of THF (about 120 bar). Furthermore, hydrogen hydrates are comparatively simple in that only hydrogen gas, water, and low concentrations of polar solvents are needed for their preparation.

Provided herein are methods for the design, engineering, and integration of microchemical devices for hydrogen storage. Also provided herein are examples of scaling of hydrogen storage devices and the overall process thermodynamics. Further, the fundamental nanoscale phenomena that dictate the emergent hydrate formation and separation mechanisms in multiphase microflow are demonstrated herein.

In the disclosed methods, the clathrate hydrates are formed in a multiphase segmented flow in a channel of a microreactor. The small length scales of microreactors allows precise control over the melting (i.e., dissociation) of the hydrates to release the stored hydrogen. Consequently, an array of microreactors can itself serve as a compressed gas tank but with considerably better control over thermodynamics and safety.

The molecular simulation and experimental separation of hydrogen hydrates in the presence of acoustic forces demonstrate how the controlled release of confined hydrogen can be accomplished with sound waves, thus providing a method for the precise, controlled, and sustainable release of stored hydrogen. The multistep continuous manufacturing of hydrates is also employed to separate hydrogen and other small molecules in chemical processes (i.e., the formation of hydrogen hydrate results in a chemical separation of hydrogen gas from a process stream). Further, the multistep formation and separation of inclusion compounds can be used in continuous flow chemical processes that warrant the removal of small molecules (<10 angstroms).

The examples below are intended to further illustrate certain aspects of the methods and compositions described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

The examples provided herein demonstrate the synthesis, control, and dissociation of clathrate hydrates according to the disclosed methods. Specifically, described herein are methods of using microchemical devices to store hydrogen; methods for continuously generating clatharate hydrate particles in multiphase microfluidic flow, free of blockage; methods for generating high concentrations of hydrogen inclusion in the synthesized hydrates; methods for revealing the formation mechanism in multiphase microflow by molecular dynamics simulations; methods for identifying optimal $H_2$/THF/$H_2O$ ratios and induction steps for controlled hydrate growth; methods for innovating continuous separations for the isolation of the clatharate hydrate; methods for assessing the influence of acoustic standing waves on THF+$H_2$ hydrate stability; methods for integrating multiple reaction and separation steps to engineer a continuous flow platform; and methods for identifying thermodynamic conditions for optimal production and minimal energy requirements.

Also provided herein are demonstrations on the scaling and thermodynamics of hydrogen storage devices using the materials and methods disclosed herein. Also, the energy stored relative to the energy consumed for both micro and meso-scale production schemes are compared and contrasted. Further, methods for identifying the influence of heat and mass transport limitations on scaling up and methods for identifying thermodynamic conditions for optimal production and minimal energy requirements are provided.

Much of the bulk-scale knowledge and many of the continuum-level descriptions that are routinely used in current technologies begin to fail at the micrometer to nanometer length-scales. Thus, molecular-level and meso-scale simulation methods are used rather than more traditional engineering toolsets. Overall, the results generated demonstrate multistep THF+$H_2$ hydrate formation and separations and further demonstrate how to carry out the controlled manufacturing of hydrogen stored in non-covalently bonded materials. Furthermore, the molecular modeling yields new knowledge of the formation mechanism in multiphase microfluidic devices (including growth mechanisms and aggregation) and the influence of external forces (such as acoustics) on hydrate stability.

Example 1

Equipment and Materials

All gases, chemicals, and glass microreactors used herein are commercially available. Commercially available stainless steel fittings and tubing are used to interconnect the microreactors with upstream and downstream components. Fluids are delivered to the microsystems by loading a high-pressure syringe pump (e.g., Teledyne ISCO 65DM, maximum pressure=690 bar) with starting reagents and injecting into the microfluidic devices. Gas-liquid flow (i.e., hydrogen gas and aqueous) through each microreactor is made possible by compressing hydrogen in a secondary high-pressure syringe pump.

The gas-liquid membrane separator downstream of the hydrate forming reactors is integrated with a capillary membrane and vacuum pump capable of degassing excess hydrogen from the main process streams. The separation of THF+$H_2$ hydrate particles is accomplished using acoustic streaming. Here, glass microdevices are designed, fabricated, and integrated with piezoceramic elements. These experiments employ a high frequency amplifier, a waveform generator, and an oscilloscope. This equipment is useful in the creation and analysis of acoustic waves.

A commercially available 100 mL high-pressure vessel is integrated in-line with the multistep microsystem and serves as a hydrate collection cell. The regulation of this pressure vessel with a high-pressure nitrogen cylinder allows the precise control of back-pressure within each multistep microchemical device. Scale-up studies utilize analogous equipment and instruments. However, the microreactors themselves are replicated or increased in size. For the latter, commercially available stainless steel Swaglok® tubing and fittings serve as the microreactors. In this case, the cross-section dimensions are on the order of 1-10 mm and reactor volumes in the range of 1-10 mL.

The pressure drop across each microsystem is monitored using commercially available inline pressure sensors connected to a power supply, data acquisition card, and National Instruments LabView software (National Instruments; Austin, Tex.). These sensors are sensitive enough to detect changes in the resistance to flow in microfluidic devices. The composition of hydrates formed is monitored using a high-resolution confocal Raman spectrometer (Horiba Scientific, LabRAM HR) equipped with a 532 nm green diode laser. Raman spectra are collected using spot and line analysis of gas and liquid droplets flowing through each microreactor. The continuous operation of each multistep microchemical system generates mg quantities of THF+$H_2$ hydrate particles. Upon completion of the method, the collection cell is depressurized and the hydrates are melted to release the stored hydrogen for quantitative analysis with gas chromatography.

Example 2

Microchemical Synthesis of Hydrates

Figure 3A:
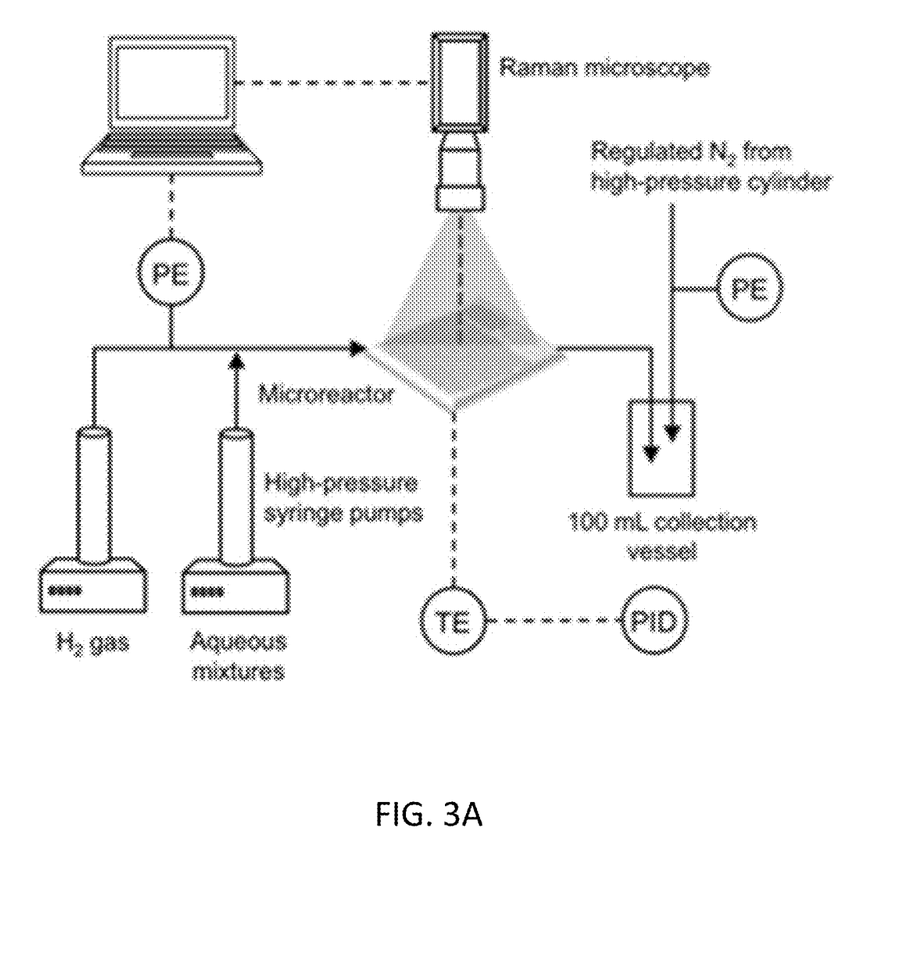
Figure 3A is a schematic of the integrated platform used to demonstrate $THF+H_2$ hydrate formation in microfluidic reactors.
Figure 3B:
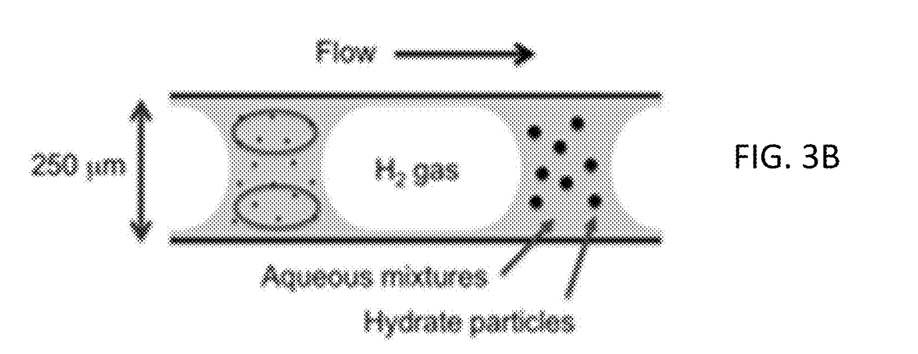
Figure 3B is a schematic demonstrating that combining hydrogen gas with aqueous mixtures will generate a gas-liquid flow whereby hydrate particles grow down the length of the microreactor.
Figure 3C:
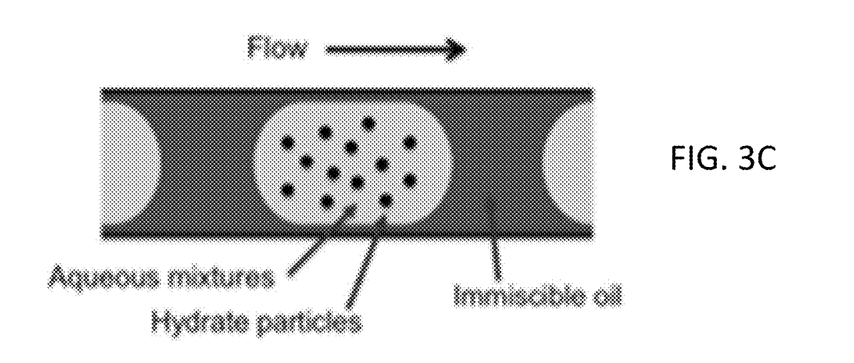
Figure 3C is a schematic demonstrating how the interaction of clathrate hydrates with microchannel walls is limited in a gas-liquid-liquid flow.

The synthesis of particles and demonstration of hydrogen gas inclusion are met by forming THF+$H_2$ hydrates in microscale flows and with MD simulations. Hydrogen gas and mixtures of 0.15-1.5 mol% THF in water are injected into a 250 µm glass microreactor at pressures and temperatures that are known to form binary sII hydrates (e.g., from 5-12 MPa at 270K). The microreactor temperature is maintained by the direct contact of an aluminum compression chuck connected to a PID controlled refrigerating circulator. Figure 3A illustrates the integrated platform that is used to generate hydrates in microreactors. A Horiba Scientific LabRAIVI HR Raman spectrometer is used to detect the number and type of H-bonds formed by the collection of Raman shifts between 4100-4200 cm$^{-1}$. This instrument is capable of analyzing a minimum spot size of 1 µm and thus allows for the analysis of multiple clathrate hydrate particles. The collection of spectral shifts is taken at various points from the entrance to the exit of each microreactor, and both a spot and line analysis are performed. As shown in Figure 3B, the formation and growth of hydrates is accomplished in hydrogen gas-liquid segmented flow. Hydrates are also formed by dispersing aqueous droplets in immiscible oil (e.g., squalane, fluorous oil, mineral oil, or any immiscible non-aqueous liquid) in contact with hydrophobic microchannel surfaces. Here, glass microreactors are made hydrophobic by the surface modification with fluorosilanes. Figure 3C highlights schematically how the interaction of clathrate hydrates with microchannel walls is limited in a gas-liquid-liquid flow. The Raman analysis of this multiphase flow yields the relative ratio of H-bonds in the gas, aqueous phase, and within hydrates themselves.

This method is strengthened by information from MD simulations, formation mechanism, and optimal conditions for particle growth. In the simulations, the thermodynamic and process conditions needed to maximize the hydrogen uptake in the hydrate product are probed. Modeling molecular-level interfacial thermodynamics has been previously demonstrated (see Turner, C. H., Journal of Physical Chemistry B, 2005, 109, 23588-23595; Turner, C. H., Langmuir, 2007, 23, 2525-2530). These methods are used herein to qualitatively determine the mechanism for hydrogen adsorption. Specifically, the methods are used to determine whether hydrogen is more easily incorporated (i) at the $H_2$ gas/liquid interface, or (ii) at the solid/liquid interface (with dissolved $H_2$); whether certain thermodynamic conditions are able to be chosen that strongly favor hydrate formation over pure ice crystals; and whether certain $THF/H_2/H_2O$ compositions are more conducive to high formation rates or high $H_2$ incorporations when working at the nanometer length-scale.

Previous studies have shown that the batch formation of $THF+H_2$ hydrates occurs over a period of several minutes to hours in which the variation is attributed to transport limitations (see Lee et al., Nature, 2005, 434, 743-746; Sugahara et al., Journal of the American Chemical Society, 2009, 131, 14616; Alavi et al., Journal of Chemical Physics, 2006, 124, 014704; Geng et al., Molecular Simulation, 2010, 36, 474-483; Hashimoto et al., Chemical Engineering Science, 2006, 61, 7884-7888; Nagai et al., AIChE Journal, 2008, 54, 3007-3016; Strobel et al., Fluid Phase Equilibria, 2009, 280, 61-67; Strobel et al., Journal of Physical Chemistry B, 2006, 110, 17121-17125; Tulk et al., Journal of Physical Chemistry A, 1998, 102, 8734-8739; Mulder et al., Chemphyschem, 2008, 9, 1331-1337). The reduced length scales made possible by the disclosed micro-scale flow increases the gas-liquid interfacial contact (i.e., the mass transfer coefficient) by two orders of magnitude. Thus, the microchemical synthesis of $THF+H_2$ hydrates eliminates heat and mass transfer resistances, and in turn makes hydrate synthesis in seconds to tens of minutes possible. Therefore, hydrate growth for residence times in the range of 1 to 60 min is demonstrated. Hydrogen uptake by the hydrates is monitored downstream by melting the hydrates and performing GC analysis. The particle sizes are monitored by capturing images with the confocal Raman microscope.

Example 3

Microfluidic Separation of Hydrates

Further demonstrated herein are the separations required to isolate $THF+H_2$ hydrates formed in the microreactors. The first separation used to accomplish this goal is the removal of excess hydrogen gas from the segmented flow shown in Figures 3B and/or 3C. Polymer membranes, such as Teflon AF® capillaries, are known to permeate molecular hydrogen yet reject liquid and solid particles. Thus, membrane separators integrated with Teflon AF® capillaries are designed to remove excess hydrogen gas in continuous flow. The selectivity in these membrane separations is assessed using microscopy and gas chromatography. For example, the successful separation of hydrogen yields a micro flow without any visual evidence of gas, and the mass of gas collected during the separation closes a mass balance.

The next separation necessary to isolate clathrate hydrates according to the scheme of Figure 3B, the removal of the particles themselves from THF + water, is also demonstrated. The small length scales in microfluidic devices constrain fluid flow to the laminar regime (i.e., Reynold's number <1), and as a result suspended particles travel along streamlines. It has been shown that the presence of an acoustic standing wave forces particles to position themselves at pressure nodes in laminar flow. The working principle relies on two criterion in order to trap flowing particles: 1) the diameters of the particles must be less than half the wavelength of an acoustic standing wave, and 2) a net force acts upon the particles when a phase difference parameter ($\varphi$), given by Equation (2):

$$\phi = \frac{5\rho_H - 2\rho_w}{2\rho_H + \rho_w} - \frac{\beta_H}{\beta_w}$$

is not equal to zero (see Laurell et al., Chemical Society Reviews, 2007, 36, 492-506; Nilsson et al., Lab on a Chip, 2004, 4, 131-135; Petersson et al., Analytical Chemistry, 2007, 79, 5117-5123; Petersson et al., Lab on a Chip, 2005, 5, 20-22). Here, $\rho_H$ and $\rho_w$ are the hydrate (H) and water (w) specific gravities, and $\beta_i$ the corresponding compressibility. For the separation of clatharate hydrate particles (<1 µm), the standing wavelength is on the order of 100 µm and hence the first criterion is satisfied. The physical properties of the clatharate hydrates themselves are considered regarding the second criterion. Assuming the specific gravity and compressibility of the clatharate hydrates are similar to ice yields $0.2<\varphi<0.6$, and thus the second criterion is also satisfied.

Commercially available piezoceramic disks are integrated with glass microchannels to innovate a continuous flow acoustic $THF+H_2$ separator. A sinusoidal wave is delivered to the microchannel with a waveform generator and amplifier in the frequency range of 2.0 MHz, which has been shown to generate the wavelengths necessary to separate particulate matter. The centerline focusing of clatharate hydrates and the geometry of the glass devices designed to concentrate the particles upon exiting the device are examined herein. For example, particles flowing in the center of the microchannel exit the multistep device into a collection cell whereas fluid flowing on either side leaves the system particle free. The study of acoustic streaming separates at least ⅔ of THF+water from the synthesized hydrates. The DPD simulations mimic the experimental set-up, and the following issues are screened through. First, the frequencies and amplitudes resulting in maximum separation (streaming) are computationally determined. Second, the influence of the acoustics on the stability of the hydrate particles is determined. In some examples, the acoustics destabilize larger crystals or indirectly induce the dissolution of the $H_2$ from the hydrates. Lastly, the tendency of the hydrate crystals to agglomerate and/or clog the microfluidic channels is explored, as well as the ability to mitigate this behavior with the applied acoustic forces.

The approach outlined in Figure 3C presents an alternative to the use of acoustic forces. The isolation of hydrates in suspended droplets generates higher particle concentrations and minimizes the need to recycle make-up water. In this case, the multiphase flow is collected in a storage vessel immediately following the separation of $H_2$ gas to allow the phase separation and recycling of oil from aqueous solutions. Yet another alternative that is considered is the continuous flow separation of the suspended hydrate rich aqueous droplets from the inert oil. Continuous flow microfluidic liquid-liquid separations are readily possible using capillary separators (see Hartman et al., Angew. Chem. Int. Ed., 2010, 49, 899-903; Sahoo et al., Angewandte Chemie-International Edition, 2007, 46, 5704-5708; Hartman et al., Lab Chip, 2009, 9, 1843-1849).

Example 4

Integrated Multistep Hydrate Manufacturing Devices

Figure 4:
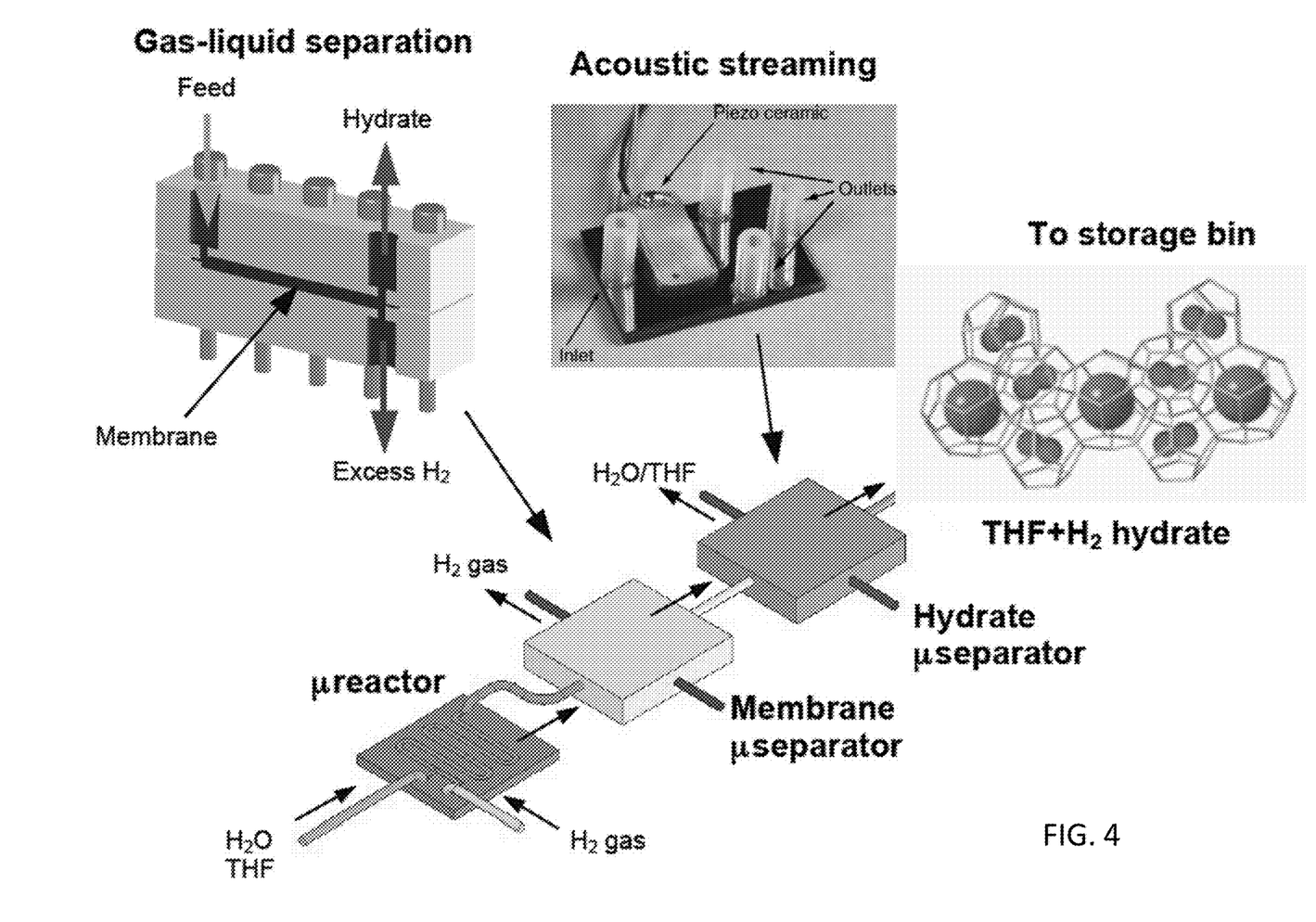
FIG. 4 shows a schematic for the reaction and separation steps in the continuous-flow microchemical synthesis of $THF+H_2$ hydrate.

THF+$H_2$ hydrate forming microreactors and inline separators are integrated to provide a multistep microchemical manufacturing device. As shown in FIG. 4, the injection of THF, water, and hydrogen gas into a multistep microchemical device is performed with the goal of continuously manufacturing and isolating THF+$H_2$ hydrate particles.

A problem of particular interest in any multistep chemical process is the influence of startup and shutdown. The multistep THF+$H_2$ manufacturing devices described herein are capable of operating indefinitely or for periods of several hours, depending on the hydrogen feedstock. Therefore, the number of system residence times required to achieve steady-state operation is demonstrated and its role on the selectivity and separation efficiency illustrated. Commercially available chemical process design software is further applied to simulate the multistep microchemical device and to demonstrate how recycling excess $H_2$ and THF+water improve the efficiency. Calculations and simulations are performed to estimate the ratio of energy input to the energy stored to identify optimal thermodynamic conditions.

Example 5

Scaling and Thermodynamics of Hydrate Manufacturing

The need to store hydrogen on scales for residential communities becomes increasingly important as science advances the discovery of photocatalysts that split water and hydrogen production from alternative feedstocks (see Heyduk et al., Science, 2001, 293, 1639-1641). In 2008, the average residential utility customer in the United States used 30 kW*h per day, which is equivalent to the consumption of 750 g/day of pure hydrogen (for a hydrogen energy density of 142 kJ/g). The overall concentration of THF+$H_2$ hydrates produced in the device of FIG. 4 is on the order of 1 vol % with a throughput of 100 µL/min. This production rate corresponds to the synthesis of 10 mg/day of stored hydrogen in the form of THF+$H_2$ hydrate. One multistep manufacturing device alone will not supply enough energy to influence residential consumption. However, scaling up or out impacts the energy needs of local consumers (see FIG. 5). For example, an array of 280 parallel microreactors (0.04×0.04×62.5 cm) provides sufficient reactor volume to generate 750 g/day of stored hydrogen. Such a device would occupy less than a 1'×1'×2' space. Furthermore, the production capacity could be increased to meet the demands of commercial facilities by the massive parallelization of residential scale devices. Scaling strategies for the disclosed manufacturing devices are illustrated in FIG. 4.

Figure 5:
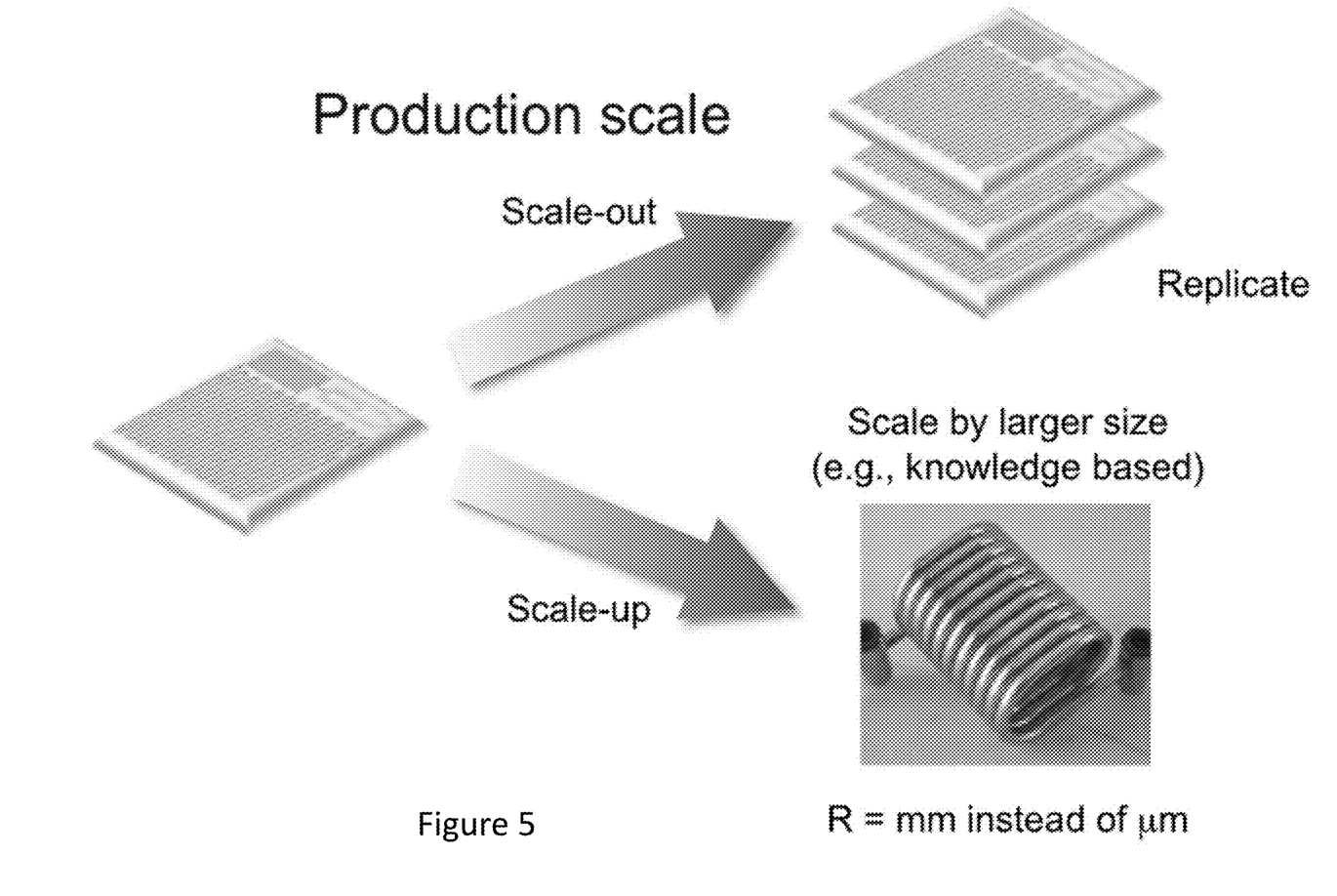
FIG. 5 shows the process for the scaling of $THF+H_2$ manufacturing devices by increasing the dimensions (e.g., scaling up) and by the replication of microsystems (e.g., scaling out).

FIG. 5 provides two different approaches to the scaling of THF+$H_2$ hydrate formation devices. Manufacturing devices are replicated to scale-out the massive production of THF+$H_2$ hydrates, or the characteristic dimensions are increased to scale-up. The major advantages of scaling by replication are twofold: 1) heat and mass transport limitations remain minimal, and 2) the high pressures and quantities of hazardous hydrogen gas remain limited by the confined dimensions inherent in microsystems. The disadvantages, however, are that replication requires sophisticated control and fluid delivery strategies. Alternatively, increasing the dimensions from micrometers to millimeters can be done. Here, the influence of increasing dimensions on the process efficiency is demonstrated by constructing a multistep process from commercially available tubing and fittings. For example, heat and mass transport limitations can become relevant as the dimensions are increased from micrometers to millimeters. Thus, the fundamental scaling parameters are determined. Estimates of the energy input relative to the energy stored are made on all scales to correlate the scale with efficiency and thus identify the optimal production scenario.

The materials and methods of the appended claims are not limited in scope by the specific materials and methods described herein, which are intended as illustrations of a few aspects of the claims and any materials and methods that are functionally equivalent are within the scope of this disclosure. Various modifications of the materials and methods in addition to those shown and described herein are intended to fall within the scope of the appended claims. Further, while only certain representative materials, methods, and aspects of these materials and methods are specifically described, other materials and methods and combinations of various features of the materials and methods are intended to fall within the scope of the appended claims, even if not specifically recited. Thus a combination of steps, elements, components, or constituents can be explicitly mentioned herein; however, all other combinations of steps, elements, components, and constituents are included, even though not explicitly stated.

What is claimed is:

1. A method of producing a clathrate hydrate, comprising:
providing a multiphase segmented microfluidic flow in a channel of a microreactor, wherein one phase of the multiphase segmented microfluidic flow is an aqueous phase and another phase is an inert oil phase;
adding hydrogen gas and a secondary guest molecule to the flow; and
forming the clathrate hydrate under hydrate forming conditions.

2. The method of claim 1, wherein the method is a continuous method.

3. The method of claim 1, wherein the multiphase segmented microfluidic flow is in a plurality of channels in an array of microreactors.

4. The method of claim 1, wherein the microreactor is comprised of silicon, glass, steel, polymer, or ceramic.

5. The method of claim 1, wherein the microreactor comprises channels coated with fluorosilanes.

6. The method of claim 1, wherein the microreactor has channels with a cross sectional dimension of from about 1 to about 10 µm.

7. The method of claim 1, wherein the microreactor has channels with a cross sectional dimension of from about 10 to about 100 µm.

8. The method of claim 1, wherein the microreactor has channels with a cross sectional dimension of from about 100 to about 1000 µm.

9. The method of claim 1, wherein the microreactor has channels with a cross sectional dimension of greater than 1000 µm.

10. The method of claim 1, further comprising isolating the clatharate hydrate.

11. The method of claim 10, where the clatharate hydrate is isolated by applying an acoustical wave to the flow after the clathrate hydrate has formed and then collecting the clatharate hydrate.

12. The method of claim 1, wherein excess hydrogen is removed from the flow after forming the clathrate hydrate.

13. The method of claim 12, wherein the excess hydrogen is removed by passing the flow through an amorphous fluoroplastic membrane.

14. The method of claim 1, wherein the formation of the clathrate hydrate is observed by Raman spectroscopy.

15. The method of claim 1, wherein the secondary guest molecule is one or more molecules selected from the group consisting of tetrahydrofuran, tert-butylamine, hexafluorophosphoric acid, and tetrabutylammonium bromide.

16. The method of claim 1, wherein the clathrate hydrate comprises tetrahydrofuran and hydrogen gas.

17. The method of claim 1, wherein from about 0.15 to about 5 mol % of tetrahydrofuran is added as the secondary guest molecule.

18. The method of claim 1, wherein the hydrate forming conditions are from about −10° C. to about 25° C. and from about 10 bar to about 200 bar.

19. The method of claim 1, wherein the hydrate forming conditions are about 3° C. and from about 50 to about 120 bar.

* * * * *